US008813326B2

(12) United States Patent
Zychowski et al.

(10) Patent No.: US 8,813,326 B2
(45) Date of Patent: Aug. 26, 2014

(54) COMPRESSION APPARATUS AND METHODS FOR USE THEREOF

(75) Inventors: Randal Frank Zychowski, LeRoy, IL (US); Ronnie D. Boggs, Springfield, IL (US)

(73) Assignee: Eaton Corporation, Cleveland, OH (US)

( * ) Notice: Subject to any disclaimer, the term of this patent is extended or adjusted under 35 U.S.C. 154(b) by 499 days.

(21) Appl. No.: 13/173,036

(22) Filed: Jun. 30, 2011

(65) Prior Publication Data

US 2013/0000430 A1 Jan. 3, 2013

(51) Int. Cl.
*B23P 19/04* (2006.01)
*B25B 27/30* (2006.01)
*F16F 9/32* (2006.01)

(52) U.S. Cl.
CPC ............... *B25B 27/30* (2013.01); *B25B 27/304* (2013.01); *F16F 9/3271* (2013.01)
USPC ........................ 29/238; 269/3; 269/6; 29/278

(58) Field of Classification Search
CPC .......... B25B 27/10; B25B 27/16; B25B 3/00; B25B 5/06; B25B 5/00; B25B 5/085; B25B 5/125; B21D 39/046
USPC ............... 29/238, 255–260, 278; 269/3, 6, 95
See application file for complete search history.

(56) References Cited

U.S. PATENT DOCUMENTS

| | | | | |
|---|---|---|---|---|
| 1,583,611 | A * | 5/1926 | Seely | 269/146 |
| 5,906,034 | A * | 5/1999 | Weisshaar | 29/257 |
| 6,089,556 | A * | 7/2000 | Whiteford | 269/149 |
| 7,134,651 | B1 * | 11/2006 | Beck | 269/147 |
| 7,310,864 | B1 * | 12/2007 | Gingerich et al. | 29/256 |
| 7,328,891 | B2 * | 2/2008 | Watanabe et al. | 269/166 |
| 8,434,205 | B2 * | 5/2013 | Dewell | 29/237 |
| 2013/0000430 | A1 * | 1/2013 | Zychowski et al. | 74/89.23 |

* cited by examiner

*Primary Examiner* — Lee D Wilson
(74) *Attorney, Agent, or Firm* — Eckert Seamans Cherin & Mellott, LLC; Grant E. Coffield

(57) ABSTRACT

An apparatus for compressing or decompressing a compressible body is provided. The apparatus comprises an upper nest arm and a lower nest arm separated by a rigid rod. The upper nest arm has an upper nest arm mounting feature configured to receive a first end of the compressible body. The upper nest arm mounding feature is shaped to fit the contours of the compressible body. The lower nest arm has a lower nest arm mounting feature configured to receive a second end of the compressible body. The lower nest arm can traverse the rigid rod to either compress or decompress the compressible body.

5 Claims, 5 Drawing Sheets

COMPRESSION APPARATUS AND METHODS FOR USE THEREOF

BACKGROUND

Compressing a gas shock for removal from a machine or decompressing a gas shock for installation on a machine can be a dangerous venture. Gas shocks, such as those used in manufacturing, often incur substantial force during compression. Conventionally, wires have been used to bind and compress gas shocks during installation and removal. However, if the wires break or the gas shock slips out of the wires, the gas shock decompresses with substantial force. Accordingly, removal or installation of the gas shock may result in an explosive release of force that may prove dangerous to an operator.

SUMMARY

An apparatus for compressing or decompressing a compressible body is provided. The apparatus comprises an upper nest arm and a lower nest arm separated by a rigid rod. The upper nest arm comprises an upper nest arm mounting feature configured to receive a first end of the compressible body. The upper nest arm mounting feature is shaped to fit the contours of the compressible body. The lower nest arm comprises a lower nest arm mounting feature configured to receive a second end of the compressible body. A lower nest arm driver mechanism is configured to cause the lower nest arm to traverse the rigid rod relative to the upper nest arm.

The upper nest arm mounting feature may comprise a first opening and a second opening separated by an intermediary opening. The first opening, second opening, and intermediary opening are configured to collar the first end of the compressible body. The first opening and the second opening may have different shapes to contour different portions of the first end of the compressible body.

The lower nest arm mounting feature may comprise an opening with a variable radius. The opening with the variable radius may be a depression configured to hold a second end of the compressible body. A bushing extends axially along the rigid rod beyond the lower nest arm. The bushing acts as a support guide for the lower nest arm when the lower nest arm driver mechanism causes the lower nest arm to traverse the rigid rod relative to the upper nest arm. The lower nest arm driver mechanism is separated from the lower nest arm by a thrust bearing.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

A compressible body must be adequately constrained to avoid the compressible body being accidentally released during removal from a machine or installation on a machine. Described herein are methods and apparatus by which an operator may compress and decompress a compressible body in a controlled manner. Accordingly, the compression apparatus is provided that is securely fitted to the compressible body to reduce the chance of slippage. For the purposes of this description, the compressible body is a gas shock. The compression apparatus discussed herein can be used to compress or decompress any compressible body.

Figure 1:
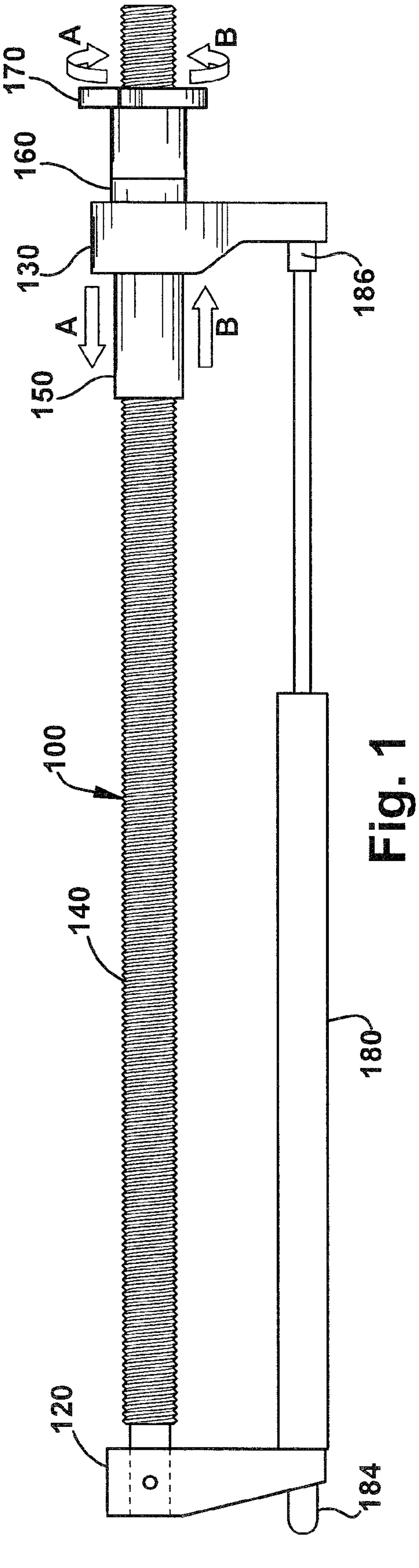
FIG. 1 illustrates an example embodiment of a compression apparatus.

Referring to FIG. 1, an example embodiment of a compression apparatus 100 installed on a gas shock 180 is illustrated. The compression apparatus 100 includes an upper nest arm 120 connected to a rigid rod 140. The upper nest arm 120 is configured to be coupled to a first end 184 of the gas shock 180. The compression apparatus 100 further includes a lower nest arm 130. The lower nest arm 130 is configured to be coupled to a second end 186 of the gas shock 180.

The lower nest arm 130 is configured to be movable in a compression direction (arrow "A") and decompression direction (arrow "B") along the rigid rod 140. A bushing 150 surrounds a section of the rigid rod 140 and is positioned between the rigid rod 140 and the lower nest arm 130.

The rigid rod 140 is threaded to allow a threaded lower nest arm driver mechanism 170 to traverse the rigid rod 140 in the compression and decompression directions. A thrust bearing 160 is disposed between the lower nest arm 130 and the lower nest arm driver mechanism 170. The lower nest arm driver mechanism 170 is movable in a predetermined decompression direction along the rigid rod 140 to decompress the gas shock 180. The lower nest arm driver mechanism 170 uses substantially less force to turn than the force required to compress the gas shock 180 without the aid of the compression apparatus 100. The compression of the gas shock 180 can be regulated by controlling the rotation of the lower nest arm driver mechanism 170. Therefore, the rate compression of the gas shock 180 may be regulated by regulating the force used to drive the lower nest arm driver mechanism 170. Alternatively, the lower nest arm driver mechanism 170 may be configured with a motive device (e.g., spring, hydraulics).

The bushing 150 extends axially along the rigid rod 140 beyond the lower nest arm 130. The length that the bushing 150 extends axially along the rigid rod 140 may be proportional to the length that the lower nest arm 130 extends radially from the rigid rod 140. The bushing 150 may be one of a solid sleeve bushing, a flanged bushing, or a cleaved bushing. The bushing 150 may be constructed of a soft metal (e.g., bronze, gold). The bushing 150 acts as a buffer between the rigid rod 140 and the lower nest arm 130. If the rigid rod 140 has threading, the bushing 150 alleviates the force of the lower nest arm 130 on the rigid rod 140 to avoid the lower nest arm 130 binding on or damaging the threading of the rigid rod 140.

Figure 2C:
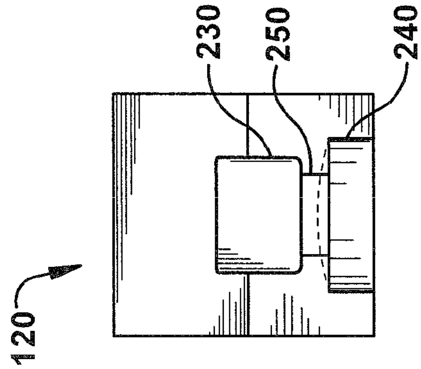
FIG. 2C is a front view of an example embodiment of an upper nest arm of the compression apparatus shown in FIG. 1.
Figure 2A:
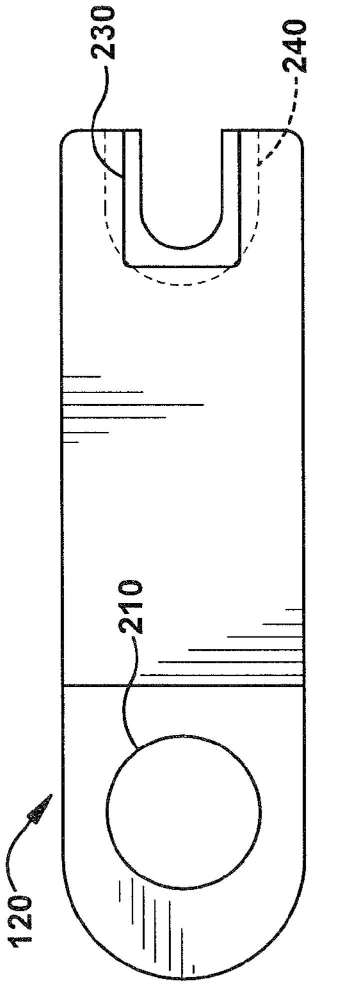
FIG. 2A is a top view of an example embodiment of an upper nest arm of the compression apparatus shown in FIG. 1.

Referring to FIG. 2A, a top view of an example embodiment of the upper nest arm 120 of FIG. 1 is illustrated. The upper nest arm 120 has a rigid rod cutout 210. The rigid rod cutout 210 is an opening configured to house the rigid rod 140 (FIG. 1).

The upper nest arm 120 is configured with a first opening 230 and a second opening 240. The first opening 230 and the second opening 240 are configured to be coupled to the first end 184 of the gas shock 180 (FIG. 1). The first opening 230 has three sides that form an open rectangular shaped opening. In the embodiment illustrated, the second opening 240 has a rounded shape. The shape of the first opening 230 and the second opening 240 may be designed to fit the contours of a specific gas shock 180.

Figure 2B:
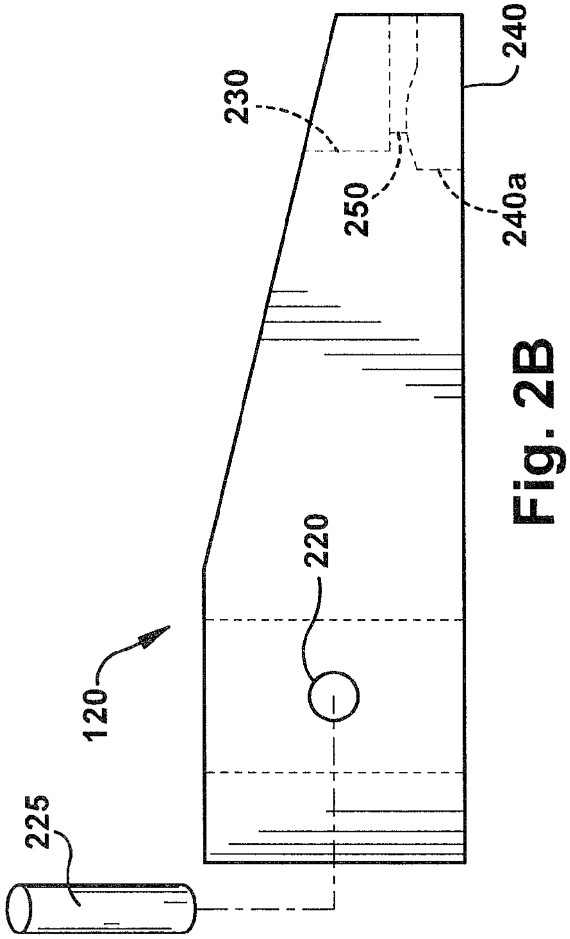
FIG. 2B is a side view of an example embodiment of an upper nest arm of the compression apparatus shown in FIG. 1.

Referring to FIG. 2B, a side view of an upper nest arm 120 is illustrated. The first opening 230 and the second opening 240 are connected by an intermediary opening 250. The intermediary opening 250 connects less than a whole portion of the first opening 230 and the second opening 240. Together the first opening 230, the second opening 240, and the intermediary opening 250 form a collar that is configured to hold a first end 184 of the gas shock 180.

An interior portion 240*a* of the second opening 240 has a dome shape. The radius of the dome shape is variable. A portion of the first end 184 of the gas shock 180 (FIG. 1) can snap fit into the variable dome shape of the interior portion of the second opening 240. The upper nest arm 120 holds the portion of the first end 184 of the gas shock 180 in place due to the outward force exerted on the upper nest arm 120 by the gas shock 180. Accordingly, the portion of the first end 184 of the gas shock 180 is held in place by the dome shape of the interior portion 240*a* of the second opening 240, and removal of the gas shock 180 from the upper nest arm 120 requires decompression of the gas shock with respect to the upper nest arm 120. Thus, the dome shape of the interior portion 240*a* of the second opening 240 is a safety feature that holds the gas shock 180 in place.

The upper nest arm 120 is further configured with an upper nest arm dowel opening 220. The upper nest arm dowel opening 220 functions in conjunction with a matching rigid rod dowel opening (430 of FIG. 4A) in the rigid rod 140. The upper nest arm dowel opening 220 and the matching rigid rod dowel opening are configured to receive an upper nest arm dowel 225. The upper nest arm dowel opening 220 and the matching rigid rod dowel opening are located such that the upper nest arm dowel 225 may occupy both the upper nest arm dowel opening 220 and the matching rigid rod dowel opening. The upper nest arm dowel 225 prevents movement (e.g., rotation) of the rigid rod 140 relative to the upper nest arm 120. The upper nest arm 120 may be configured with a plurality of upper nest arm dowel openings.

Referring to FIG. 2C, a front view of an example embodiment of the upper nest arm 120 of FIG. 1 is illustrated. The first opening 230, the second opening 240, and the intermediary opening 250 are configured to receive the first end 184 of the gas shock 180 (FIG. 1). In this manner, a portion of the first end 184 of the gas shock 180 can be recessed into the first opening 230, the second opening 240, and the intermediary opening 250.

Figure 3A:
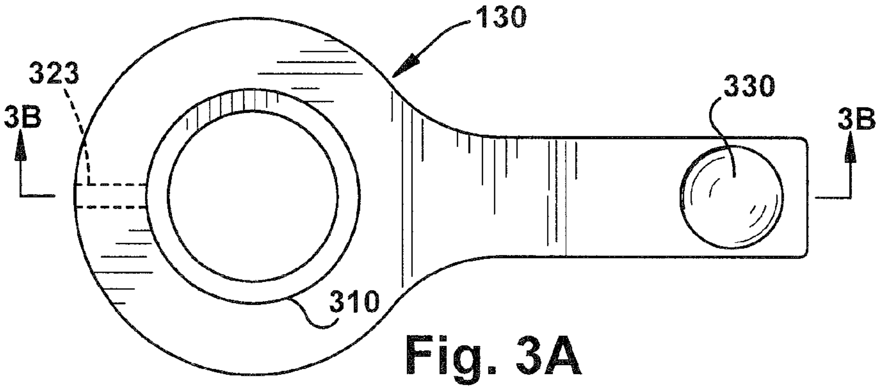
FIG. 3A is a top view of an example embodiment of a lower nest arm of the compression apparatus shown in FIG. 1.

Referring to FIG. 3A, a top view of an example embodiment of the lower nest arm 130 of FIG. 1 is illustrated. The lower nest arm 130 is configured with a bushing cutout 310. The bushing cutout 310 is an opening configured to house the bushing 150 (FIG. 1). The lower nest arm 130 has at least one lower nest arm dowel opening 323. The lower nest arm dowel opening 323 functions in conjunction with a matching bushing dowel opening (not shown) in the bushing 150. The lower nest arm dowel opening 323 and the matching bushing dowel opening are configured to receive a lower nest arm dowel that anchors the bushing 150 to the lower nest arm 130.

The lower nest arm 130 is further configured with depression 330. The depression 330 is configured to receive a second end 186 of the gas shock 180 (not shown). The second end 186 of the gas shock 180 can be snapped into the depression 330.

Figure 3B:
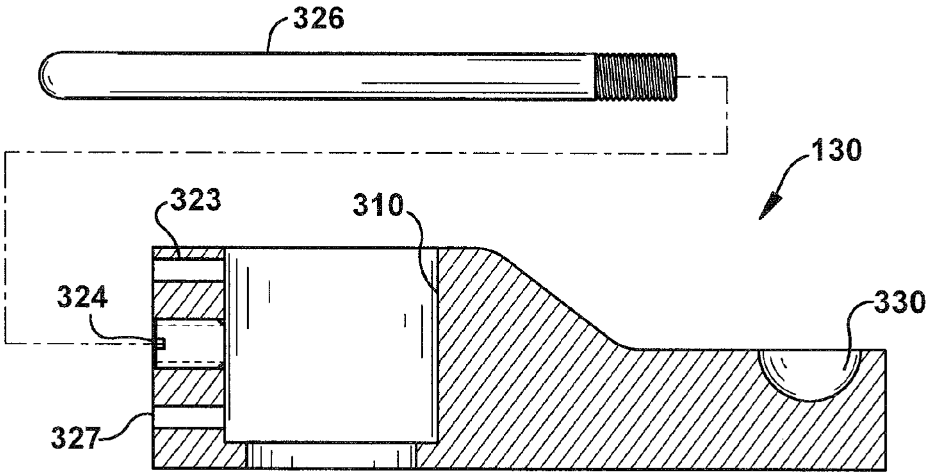
FIG. 3B is a side cross section view of an example embodiment of a lower nest arm of the compression apparatus shown in FIG. 1.

Referring to FIG. 3B, a side cross section view of the lower nest arm 130 is illustrated. The depression 330 has a curved shape that holds the second end 186 of the gas shock 180 in place. The second end 186 of the gas shock 180 cannot be removed from the lower nest arm 130 without the gas shock 180 being decompressed relative to the lower nest arm 130.

In the embodiment illustrated in FIG. 3B, the lower nest arm 130 has a first lower nest arm dowel opening 323 and a second lower nest arm dowel opening 327. The lower nest arm 130 may have a plurality of lower nest arm dowel openings. The lower nest arm dowel openings have matching bushing dowel openings (not shown) that are located such that a lower nest arm dowel (not shown) may occupy both the lower nest arm opening 323 (or 327) and the matching bushing dowel opening (not shown). The lower nest arm dowel connects the lower nest arm 130 and the bushing 150 so that the lower nest arm 130 and the bushing 150 move as a unit.

In one embodiment illustrated in FIG. 3B, the lower nest arm 130 has a holding rod opening 324. The holding rod opening 324 may be threaded to allow a holding rod 326 to be attached to the lower nest arm 130. A portion of a holding rod 326 may have complimentary threading allowing the holding rod 326 to be threaded into the holding rod opening 324. The threaded portion of the holding rod 326 may allow the holding rod 326 to be threaded such that the holding rod 326 is in contact with the bushing 310. The non-threaded portion of the holding rod 326 may be designed ergonomically to allow a user to grip the holding rod 326 while the compression apparatus 100 is in use. The holding rod 326 adds an additional safety feature by giving a user more control of the compression apparatus 100.

Figure 3C:
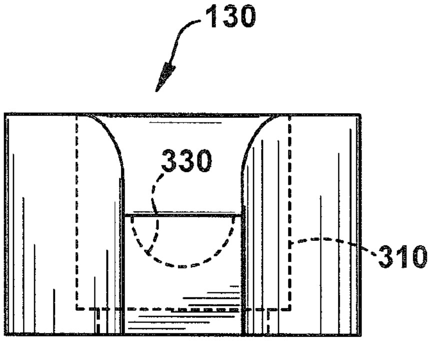
FIG. 3C is a front view of an example embodiment of a lower nest arm of the compression apparatus shown in FIG. 1.

Referring to FIG. 3C, a front view of an example embodiment of the lower nest arm 130 of FIG. 1 is illustrated. In the embodiment illustrated in FIG. 3C the depression 330 is not as deep as the bushing cutout 310. In alternative embodiments the depression 330 may be deeper or shallower. The shape of the depression 330 may depend on the shape of the second end 186 of the gas shock 180. For example, the depression 330 may have a different shape (e.g., rectangular, triangular, dome, elliptical) to hold the second end 186 of the gas shock 180 in position.

Figure 4A:
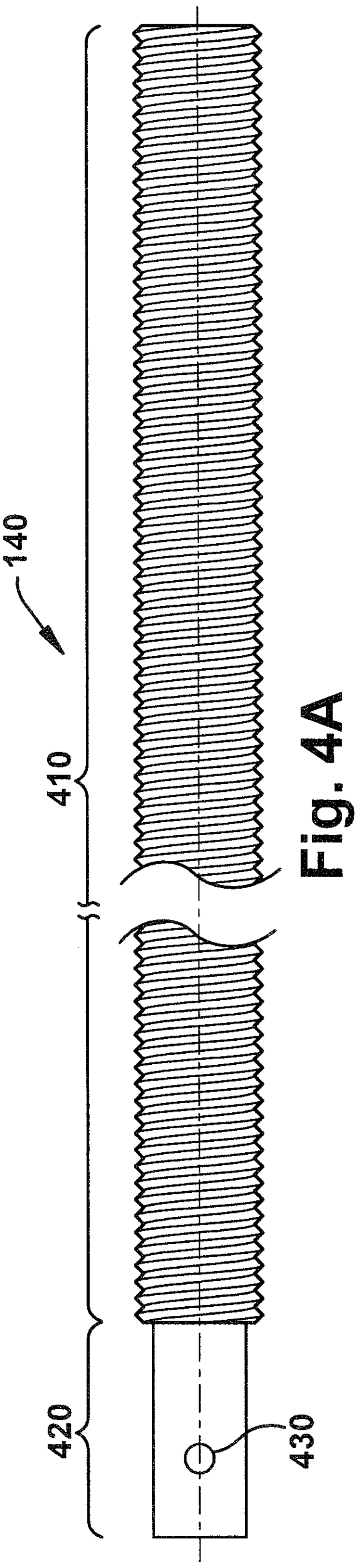
FIG. 4A illustrates an example embodiment of a rigid rod of the compression apparatus shown in FIG. 1.

Referring to FIG. 4A, an example embodiment of the rigid rod 140 of FIG. 1 is illustrated. The rigid rod 140 may have sections having different diameters. For example, section 410 has a larger diameter than section 420 of the rigid rod 140. Section 410 may be threaded to allow the lower nest arm driver mechanism 170 to traverse the rigid rod 140. The diameter of section 420 may be based, at least in part, on the diameter of the rigid rod cutout 210 (FIG. 2) of the upper nest arm so that section 420 fits within the rigid rod cutout 210.

Section 420 of the rigid rod 140 may be configured with rigid rod dowel opening 430. The rigid rod dowel opening 430 functions in conjunction with a matching upper nest arm dowel opening (220 of FIG. 2B) in the upper nest arm 120. The rigid rod dowel opening 430 and the matching upper nest arm dowel opening 220 are configured to receive an upper nest arm dowel (225 of FIG. 2B). The rigid rod dowel opening 430 and the matching upper nest arm dowel opening 220 are located such that the upper nest arm dowel 225 may occupy both the rigid rod dowel opening 430 and the matching upper nest arm dowel opening 220. The upper nest arm dowel 225 prevents movement (e.g., rotation) of the rigid rod 140 relative to the upper nest arm 120.

Figure 4B:
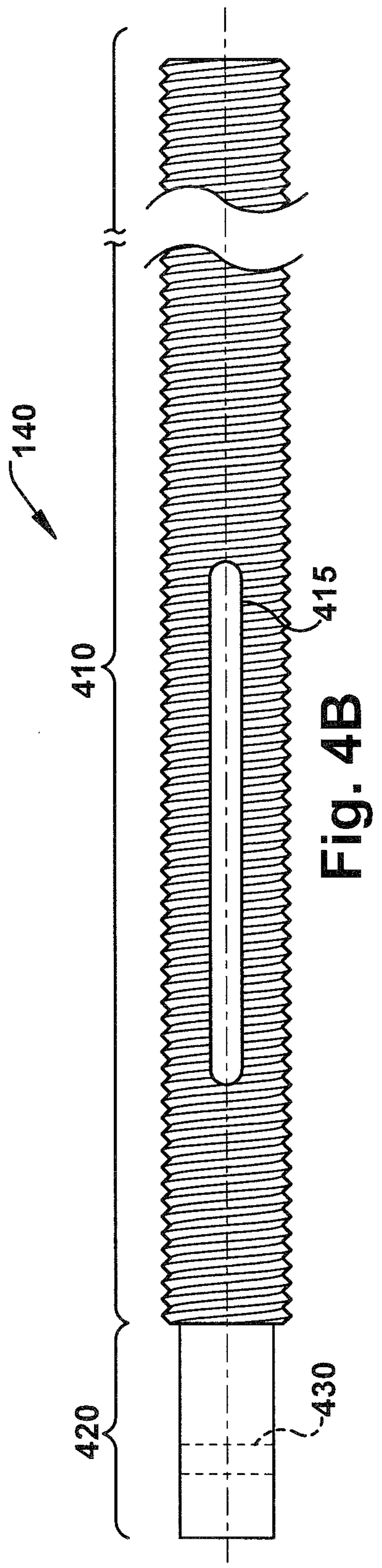
FIG. 4B illustrates an example embodiment of a rigid rod of the compression apparatus shown in FIG. 1.

Referring to FIG. 4B, an example embodiment of the rigid rod 140 has a rigid rod slot 415. The rigid rod slot 415 is located in section 410 of the rigid rod 140. The rigid rod slot 415 is configured to allow lower nest arm dowels to pass through the lower nest arm openings 323 and 327, the matching bushing dowel openings 523 and 527, and further into the rigid rod slot 415. The rigid rod slot 415 prevents the lower nest arm 130 and bushing 150 from rotating around the rigid rod 140. Accordingly, the lower nest arm 130 and bushing 150 are aligned by the lower nest arm dowels moving in the rigid rod slot 415 so that the lower nest arm 130 and bushing 150 move linearly along the rigid rod 140.

Figure 5:
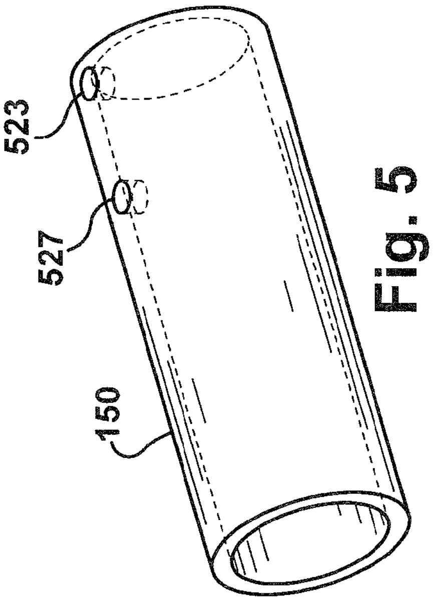
FIG. 5 illustrates an example embodiment of a bushing of the compression apparatus shown in FIG. 1.

Referring to FIG. 5, an example embodiment of the bushing 150 of FIG. 1 is illustrated. The bushing 150 has a first matching dowel opening 523 and a second matching dowel opening 527. Lower nest arm dowels (not shown) can be positioned through both one of the lower nest arm dowel openings and the corresponding matching bushing dowel openings to anchor the bushing 150 to the lower nest arm 130.

Figure 6:
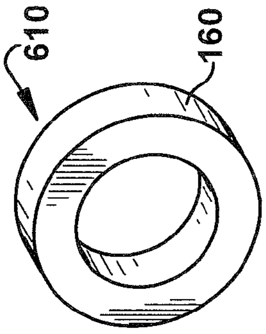
FIG. 6 illustrates an example embodiment of a bearing of the compression apparatus shown in FIG. 1.

Referring to FIG. 6, an example embodiment of the thrust bearing 160 of FIG. 1 is illustrated. The thrust bearing 160 is configured to support rotation of the lower nest arm driver mechanism 170. The thrust bearing 160 may be configured to allow the lower nest arm driver mechanism 170 to rotate without translating the rotational force of the lower nest arm driver mechanism 170 to the lower nest arm 130 and the bushing 150. Accordingly, the rotational force of the turning lower nest arm driver mechanism 170 is translated to the lower nest arm 130 as a linear force along the rigid rod 140.

Figure 7:
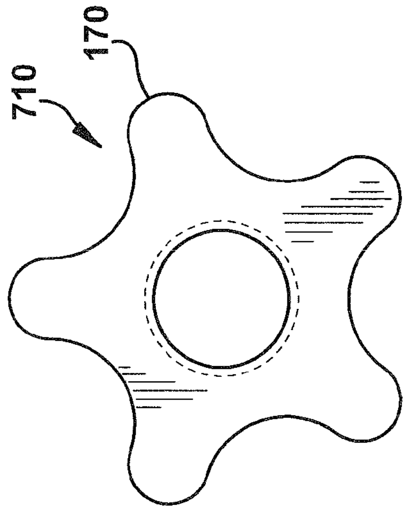
FIG. 7 is a front view of an example embodiment of a lower nest arm driver mechanism of the compression apparatus shown in FIG. 1.

Referring to FIG. 7, a front view of an example embodiment of the lower nest arm driver mechanism 170 of FIG. 1 is illustrated. The lower nest arm driver mechanism 170 may be configured with internal threading such that the lower nest arm driver mechanism 170 may be threaded from one end of the rigid rod 140 to the opposite end of the rigid rod 140. The lower nest arm driver mechanism 170 may be designed to be hand threaded. Accordingly, the lower nest arm driver mechanism 170 may be ergonomically shaped to make the lower nest arm driver mechanism 170 easier to turn.

Figure 8:
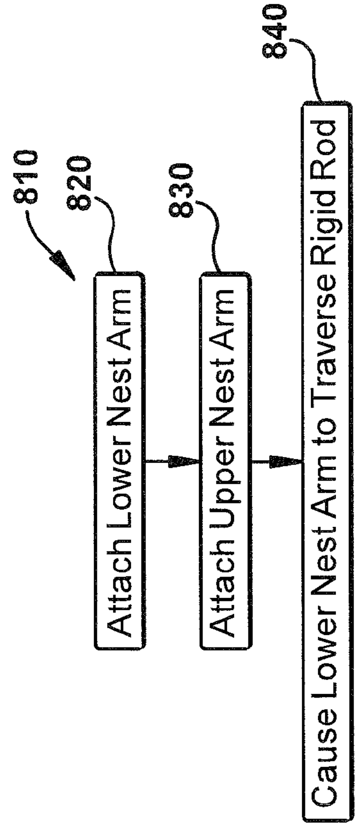
FIG. 8 is a flow diagram outlining one embodiment of a method for compressing a compressible body with a compression apparatus.

FIG. 8 is a flow diagram outlining one embodiment of a method 810 for compressing a gas shock with a compression apparatus. At 820, a lower nest arm of the compression apparatus is attached to the second end of the gas shock. The lower nest arm includes a lower nest arm mounting feature. The lower nest arm mounting feature may be a depression that engages the second end of the gas shock. The depression is configured to couple the lower nest arm to the second end of the gas shock. The second end of the gas shock is seated in the depression.

At 830, an upper nest arm of the compression apparatus is attached to the first end of the gas shock. The upper nest arm includes an upper nest arm mounting feature. The upper nest arm mounting feature allows the first end of the gas shock to be coupled to the upper nest arm. The upper nest arm mounting feature may include first opening that is shaped to fit the contours of the first end of the gas shock. Accordingly, the first end of the gas shock may be recessed into the first opening to reduce movement of the gas shock in the upper nest arm.

At 840, the lower nest arm traverses a rigid rod resulting in compression of the gas shock. The rigid rod connects the lower nest arm to the upper nest arm. The lower nest arm is driven by the driver mechanism to traverse back and forth along the rigid rod. The rigid rod may be threaded and the lower nest arm driver mechanism may be a nut threaded onto the rod. The lower nest arm may traverse the rod in response to the rotation of the nut being rotated in a first direction.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A compression apparatus comprising:

an upper nest arm connected to a rigid rod at a first end of the rigid rod, where the upper nest arm comprises an upper nest arm mounting feature configured to receive a first end of a compressible body, and where the upper nest arm mounting feature is shaped to fit the contours of the first end of the compressible body;

a lower nest arm connected to a second end of the rigid rod, where the lower nest arm has a lower nest arm mounting feature configured to receive the second end of the compressible body; and a lower nest arm driver mechanism configured to cause the lower nest arm to traverse the rigid rod relative to the upper nest arm, where the lower nest arm comprises a bushing cutout to provide clearance for a bushing, where the lower nest arm is configured with a lower nest arm dowel opening and the bushing is configured with a matching bushing dowel opening, and where the lower nest arm dowel opening and the matching bushing dowel opening are located so that a lower nest arm dowel passes through both the lower nest arm dowel opening and the matching bushing dowel opening to affix the lower nest arm to the bushing.

2. The compression apparatus of claim 1, where the rigid rod has a rigid rod slot that allows the lower nest arm dowel to pass through the lower nest arm dowel opening, the matching bushing dowel opening, and further into the rigid rod slot.

3. A compression apparatus comprising:

an upper nest arm connected to a rigid rod at a first end of the rigid rod, where the upper nest arm comprises an upper nest arm mounting feature configured to receive a first end of a compressible body, and where the upper nest arm mounting feature is shaped to fit the contours of the first end of the compressible body;

a lower nest arm connected to a second end of the rigid rod, where the lower nest arm has a lower nest arm mounting feature configured to receive the second end of the compressible body; and a lower nest arm driver mechanism configured to cause the lower nest arm to traverse the rigid rod relative to the upper nest arm, where the upper nest arm is configured with an upper nest arm dowel opening and the rigid rod is configured with a matching rigid rod dowel opening, and where the upper nest arm dowel opening and the matching rigid rod dowel opening are located so that an upper nest arm dowel passes through both the upper nest arm dowel opening and the matching rigid rod dowel opening to affix the upper nest arm to the rigid rod.

4. A compression apparatus comprising:

an upper nest arm connected to a rigid rod at a first end of the rigid rod, where the upper nest arm comprises an upper nest arm mounting feature configured to receive a first end of a compressible body, and where the upper nest arm mounting feature is shaped to fit the contours of the first end of the compressible body;

a lower nest arm connected to a second end of the rigid rod, where the lower nest arm has a lower nest arm mounting feature configured to receive the second end of the compressible body; and a lower nest arm driver mechanism configured to cause the lower nest arm to traverse the rigid rod relative to the upper nest arm, wherein the upper nest arm is structured to prevent any movement of the rigid rod relative to the upper nest arm, where the lower nest arm driver mechanism is configured to be driven with substantially less force than would be required to compress the compressible body without the compression apparatus.

5. A compression apparatus comprising:

an upper nest arm connected to a rigid rod at a first end of the rigid rod, where the upper nest arm comprises an upper nest arm mounting feature configured to receive a first end of a compressible body, and where the upper nest arm mounting feature is shaped to fit the contours of the first end of the compressible body;

a lower nest arm connected to a second end of the rigid rod, where the lower nest arm has a lower nest arm mounting feature configured to receive the second end of the compressible body; and a lower nest arm driver mechanism configured to cause the lower nest arm to traverse the rigid rod relative to the upper nest arm, wherein the upper nest arm is structured to prevent any movement of the rigid rod relative to the upper nest arm, where the upper nest arm further comprises a dowel, a first dowel opening and a cutout housing the first end of the rigid rod, where the first end of the rigid rod includes a second dowel opening, and where the dowel occupies both of the first and second dowel openings in order to prevent any movement of the rigid rod relative to the upper nest arm.

* * * * *